(12) United States Patent
Tetuo et al.

(10) Patent No.: US 7,044,354 B2
(45) Date of Patent: May 16, 2006

(54) SOLDERING SYSTEM WITH INDICATOR LIGHTS DISPLAYING SYSTEM STATUS

(75) Inventors: Yokoyama Tetuo, Osaka (JP); Ishihara Toshinobu, Hyougo (JP)

(73) Assignee: Hakko Corporation, Osaka (JP)

( * ) Notice: Subject to any disclaimer, the term of this patent is extended or adjusted under 35 U.S.C. 154(b) by 269 days.

(21) Appl. No.: 10/405,772

(22) Filed: Apr. 1, 2003

(65) Prior Publication Data

US 2004/0195292 A1 Oct. 7, 2004

(51) Int. Cl.
*B23K 13/08* (2006.01)
*B23K 15/02* (2006.01)
*B23K 16/00* (2006.01)
*B23K 1/008* (2006.01)
*B23K 3/02* (2006.01)

(52) U.S. Cl. ............................................. 228/8; 228/51
(58) Field of Classification Search ................ 228/56.5, 228/7, 8, 9, 51–55
See application file for complete search history.

(56) References Cited

U.S. PATENT DOCUMENTS

| | | | | |
|---|---|---|---|---|
| 4,358,661 A | * | 11/1982 | Kaderabek | 219/230 |
| 4,861,967 A | * | 8/1989 | Yoshimura | 219/241 |
| 4,891,497 A | * | 1/1990 | Yoshimura | 219/241 |
| 4,945,210 A | * | 7/1990 | Yoshimura | 219/241 |
| 5,495,093 A | * | 2/1996 | Griffith | 219/497 |
| 6,054,678 A | * | 4/2000 | Miyazaki | 219/237 |
| 6,087,631 A | * | 7/2000 | Miyazaki | 219/241 |
| 6,329,641 B1 | * | 12/2001 | Miyazaki et al. | 219/497 |
| 6,563,087 B1 | * | 5/2003 | Yokoyama et al. | 219/240 |
| 6,580,050 B1 | * | 6/2003 | Miller et al. | 219/85.16 |

\* cited by examiner

*Primary Examiner*—Colleen P. Cooke
(74) *Attorney, Agent, or Firm*—Squire, Sanders & Dempsey, LLP

(57) ABSTRACT

A soldering station with indicator lights to display system status is provided. The soldering station comprising a power supply and a control board coupled to the power supply. The control board is operable to adjust output of the power supply. The soldering station further comprises a card reader coupled to the control board. The card reader receives a control card from a user. The control card allows the user to change the settings of the soldering station. The soldering station also includes a plurality of indicator lights. The plurality if indicator lights illuminate in patterns that are indicative of the status of the soldering station.

45 Claims, 4 Drawing Sheets

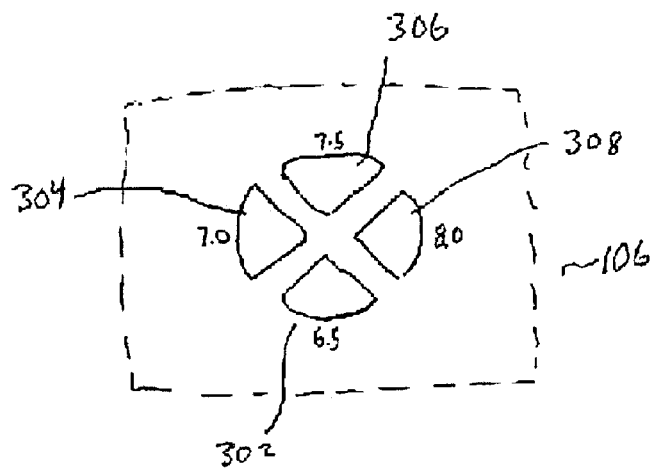
FIG. 3
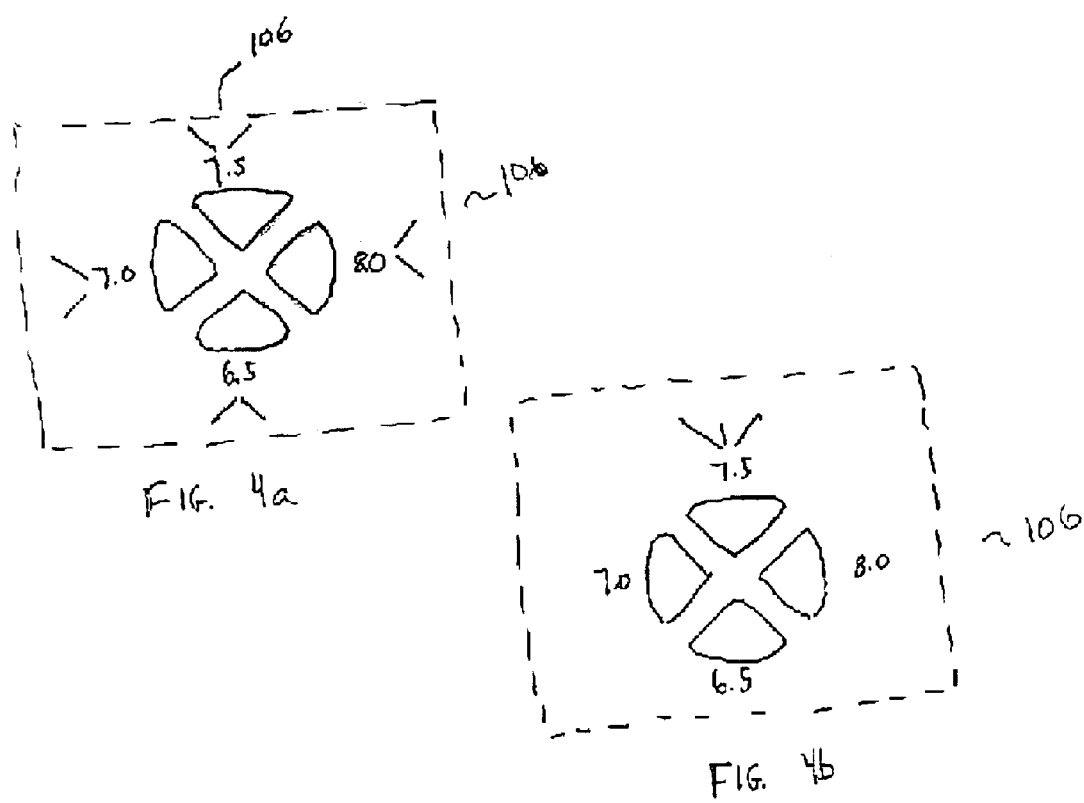
FIG. 4a
FIG. 4b

SOLDERING SYSTEM WITH INDICATOR LIGHTS DISPLAYING SYSTEM STATUS

FIELD OF THE INVENTION

The present invention relates to the field of soldering equipment and to an improved soldering system with indicator lights to display the status of the system.

BACKGROUND OF THE INVENTION

Soldering systems have been in use for many years to perform such tasks as connecting electronic components to electrical circuits. The typical soldering system includes two components: a soldering iron and a soldering station. The soldering iron is typically comprised of a connector and a cartridge assembly or a handpiece with a heater and a soldering tip. The soldering station includes a power supply for supplying current to the soldering iron and control components. The cartridge assembly has a soldering tip, which is used to solder, located at one end of the cartridge and a connector at the opposite end, which can be inserted into a handle, attached to a power cable extending from the power supply. The power cable may have many wires capable of carrying current and information between the power supply and the cartridge assembly.

Different cartridge assemblies may have different configurations for the tip. Because of the varying configurations, the tip temperature may need to be optimized for effective soldering. The thermal properties of the various tip configurations as well as the shape and the size of the tip may impact the optimal temperature to solder using that particular tip. Traditional soldering stations, which had only one power output level, did not optimize the functionality of the different cartridge tips available in the market. Further, cartridges with varying tip designs had to be manufactured around the parameters of a particular power supply. The second generation of soldering stations allowed the user to adjust the power output of the power supply using dials and knobs to better define the power required. These adjustable soldering stations could accommodate a far broader range of soldering tip configurations as compared to the traditional soldering stations.

Each soldering process has an optimum temperature that needs to be maintained within set, often specified limits for proper soldering. The control dials on the second-generation power supplies can be adjusted to provide the appropriate amount of power to obtain this optimal temperature. Before heating elements had sensors built into them, the user would have to measure the tip temperature using special thermometers, then adjust the control dials, then measure the temperature, then adjust the control dials, and so on. Using such an iterative procedure, the user would fine-tune the actual temperature until it equaled the optimal temperature. Later technology incorporated sensors within the tip itself to measure the temperature, thereby eliminating the need for the time-wasting iterative process. Accordingly, soldering stations were developed that could utilize information from sensors located in the cartridge to automatically fine-tune the power output to reach the optimal temperature.

The development of cartridge sensors changed the role of the power supply and the user. The sensors within the cartridge relayed information back to the power supply, and the power supply displayed the temperature on a display. However, in current systems the temperature range can be accidentally changed by a user inadvertently pushing a button or moving a dial. Also, the temperature of the tip is displayed in segmented light emitting diodes (LEDs) that give an Arabic numeral representation of solder tip temperature. The displays are more expensive than single LED diodes. Also segmented LEDs display the tip temperature only and not the system status.

There is thus a need in the soldering industry to provide an easier to operate soldering station that includes a visual representation of system status.

SUMMARY OF THE INVENTION

In one embodiment a soldering system is provided. The soldering system comprising: at least one soldering iron. The soldering iron includes a soldering tip. The soldering system also comprises a soldering station coupled to the soldering iron by a power cable. The soldering station comprising a power supply that generates variable levels of power to heat the soldering tip to a desired temperature and a plurality of indicator lights operable to illuminate in patterns indicative of system status.

The indicator lights can indicate the temperature of the soldering iron's tip, whether there is an internal problem to the soldering station, a problem with the soldering iron and the like. The patterns that can be displayed include both the lights that are lit and the state of illumination (steady or blinking).

The soldering system further includes a card acceptor/reader that allows changes to the system to be made if a valid card is inserted. Changes to the system include changing the temperature setting of the tip. This prevents inadvertent changes of the soldering iron's tip temperature, which helps to avoid costly mistakes or ineffective soldering.

The soldering system further comprises a control board internal to the soldering station. The control board controls the temperature of the soldering iron's tip through control of an internal power supply and based on feedback from sensors internal to the soldering iron tip. The control board or components of the control board can be changed to allow for more temperature ranges and/or different temperature ranges for the soldering iron's tip.

In another embodiment a soldering station is provided. The soldering station comprising a power supply and a control board coupled to the power supply. The control board is operable to adjust output of the power supply. The soldering station further comprises a card reader coupled to the control board. The card reader receives a control card from a user. The control card allows the user to change the settings of the soldering station. The soldering station also includes a plurality of indicator lights. The plurality of indicator lights illuminate in patterns that are indicative of the status of the soldering station.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

A detailed description of the invention will be made with reference to the accompanying drawings wherein:

FIG. 3 shows an indicator panel; and

FIGS. 4a-4d shows indicator panels displaying status information.

DETAILED DESCRIPTION OF THE INVENTION

In the following figures and description an improved soldering system is provided. The soldering system includes a soldering station that has a plurality of indicator lights that can display system status by displaying in different patterns. Additionally, the soldering station may also require the insertion of a control card before the changing of the output temperature in order to prevent mistakenly changing the temperature of the tip of the soldering iron. While the following describes the use of the present invention as a soldering station, the present invention can also be used for desoldering applications, such as desoldering components from a printed circuit board.

Figure 1:
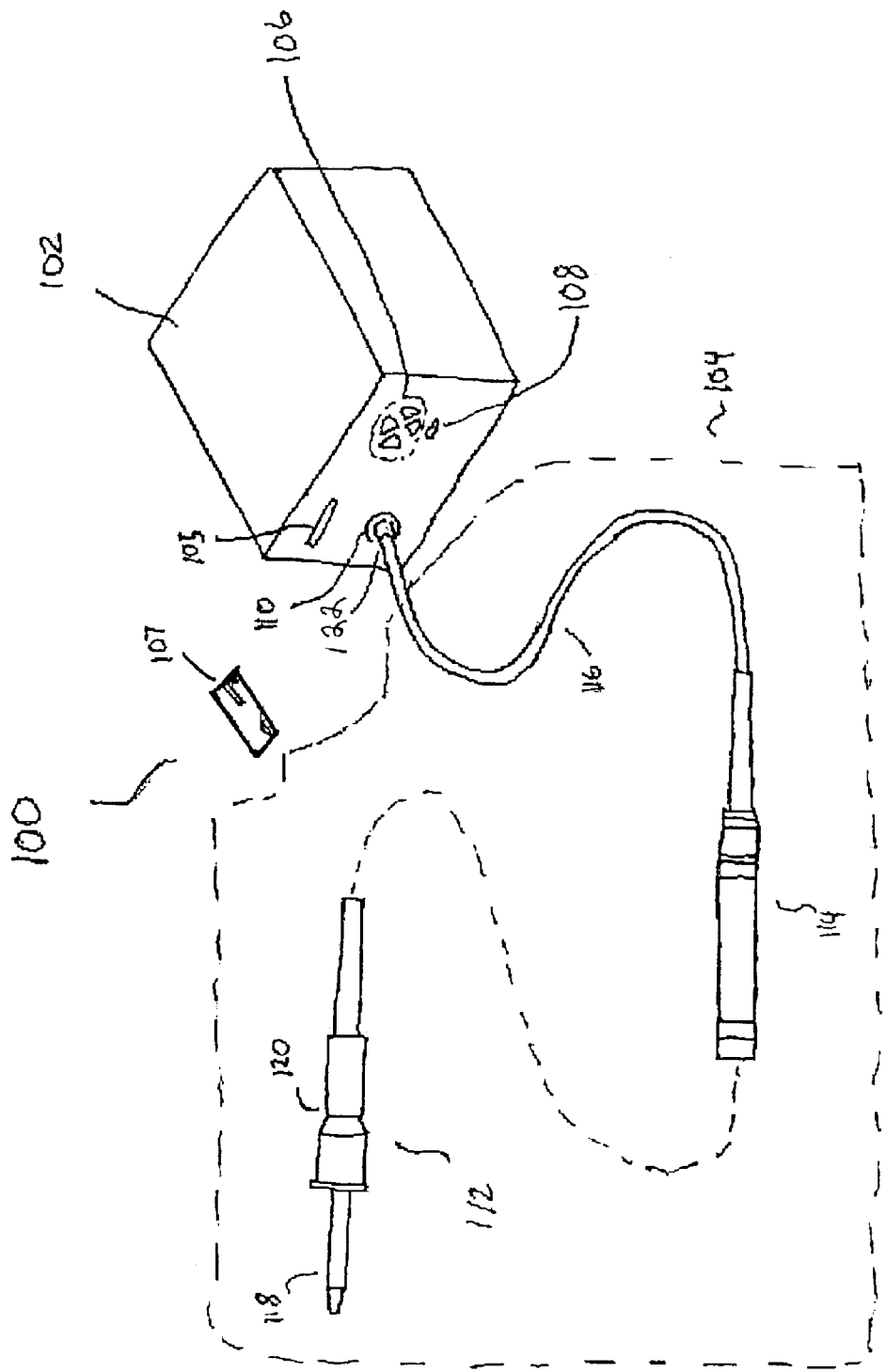
FIG. 1 shows a perspective view of the soldering system including a cartridge assembly, power supply, a reader, and a power cable coupling the cartridge to the power supply.

FIG. 1 is a perspective view of a soldering system 100 according to the present invention. The soldering system 100 comprises a soldering station 102 coupled to a soldering iron 104. The soldering station 102 includes a card acceptor 105, an indicator panel 106, a selection button 108, for changing the temperature output of the soldering station 102, and a receptacle 110. A control card 107 is provided for insertion into the card acceptor 105 in order to change the temperature output of the soldering station 102. The soldering iron 104 includes a connector assembly 114 having a power cord 116 at one end, and an opening to receive a cartridge assembly 112. The cartridge assembly 112 includes a tip 118 and a sleeve 120. The power cord 116 terminates at a connector 122. The connector 122 plugs into the receptacle 110 on the soldering station 102.

Figure 2:
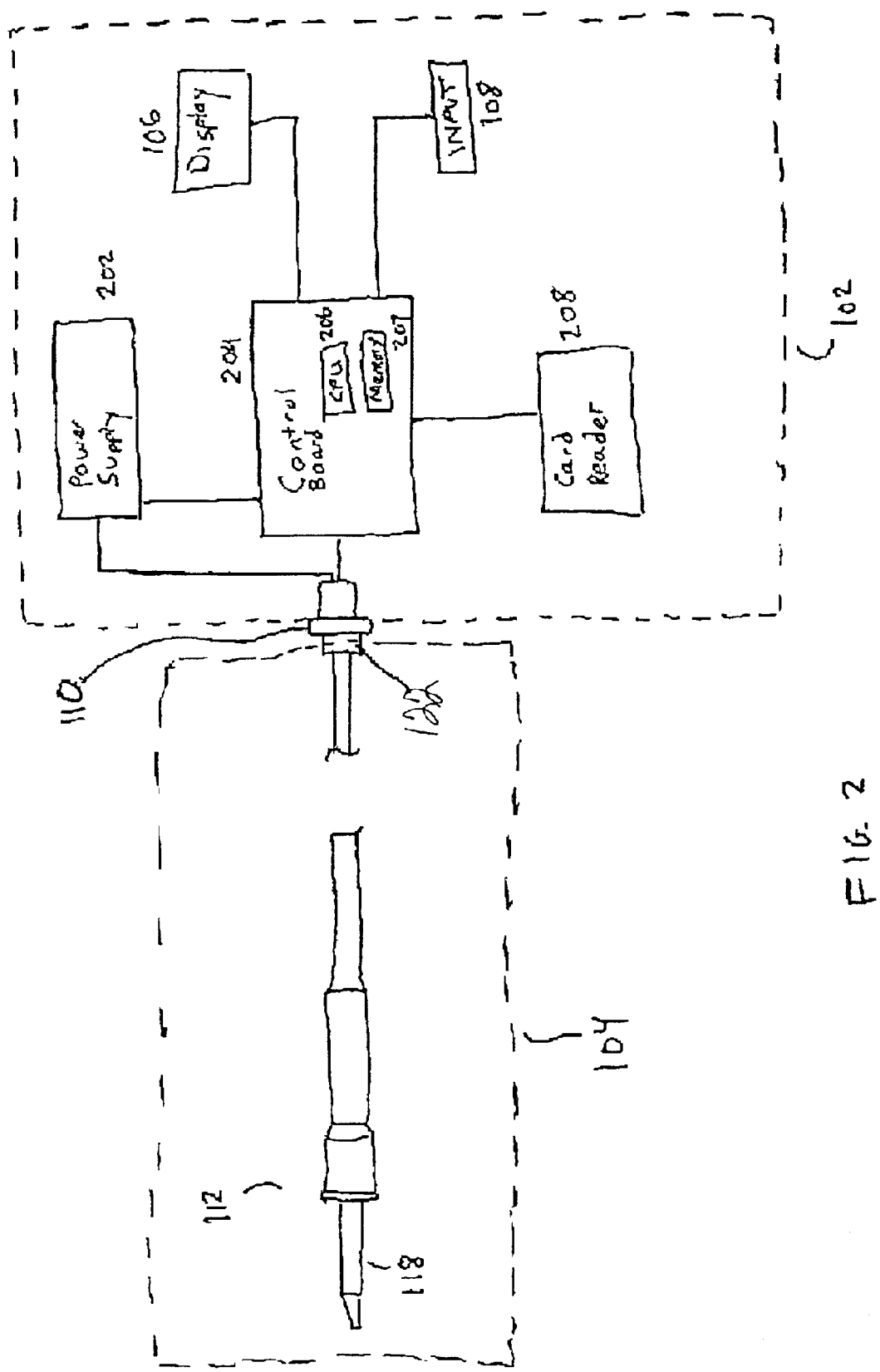
FIG. 2 is a block diagram indicating the flow of information within the soldering system of FIG. 1.

FIG. 2 is a block diagram of soldering station 102 according to the present invention. The soldering station 102 includes a power supply 202 coupled to the receptacle 110 and a control board 204. The control board 204 includes a central processing unit (CPU) 206 and memory 207. The control board 204 is coupled to and exchanges information with the card reader 208, indicator panel 106, selection button 108, and the power supply 202.

The tip 118 may be a removable tip that can be inserted into and removed from the sleeve 120. The tip 118 can come in different sizes and shapes as well as different heating requirements, the choice of which depends on the material being soldered, the solder used, and other conditions. The tip 118 typically includes one or more heating mechanisms such as a ceramic heater, as well as one or more temperature sensors integrated inside the tip 118. The tip 118, when inserted into the connector assembly 114, receives current from the power supply 202 integrated within the soldering station 102, heating the tip 118 to the desired temperature. The sensors in the tip 118 provide information to the soldering station 102 to allow automatic adjustment of the temperature of the tip 118. The operation and design of heaters and sensors integrated in a soldering iron tip are disclosed in U.S. Pat. No. 6,054,678, issued on Apr. 25, 2000, to Miyazaki and entitled "Heater-Sensor Complex", which is hereby incorporated in its entirety by reference. The sleeve 120 and/or the connector assembly 114 are insulated such that a user may manipulate the tip 118 without burning his or her hands. The sleeve 120 and/or connector assembly 114 can be manufactured from materials that reduce electrostatic discharge (ESD). While the soldering iron 104 is shown to be supplied in several pieces (tip 118, sleeve 120, and connector assembly 114), the soldering iron 104 may be supplied as a single unit or in more or fewer pieces than illustrated without departing from the scope of the present invention.

Inside the power cord 116 are a plurality of individually insulated wires, which are bundled together and wrapped in a rubber or plastic sheath. Some of the wires, when connected to the soldering station 102, transmit the current supplied by the power supply 202 in the soldering station 102 to the heaters inside the tip 118. Other wires carry information from the sensors in the tip 118 back to the soldering station 102, such as information regarding tip temperature, which is used to adjust the output of the power supply 202 to control the temperature of the tip 118. Other information may also be sent along the wires contained within power cord 116.

Soldering station 102 includes the card acceptor 105. Once the soldering station 102 is set to produce a certain temperature at the tip 118, that temperature may not be changed without inserting the control card 107 into the card acceptor 105. p The soldering station 102 also includes an indicator panel 106. As seen in FIG. 3, indicator panel 106 includes a plurality of lights 302–308. In the embodiment illustrated in FIG. 3, there are four indicator lights. Each light represents a different tip temperature setting. As illustrated in FIG. 3, the first indicator light 302 represents a tip temperature setting of 650° F., the second indicator light 304 represents a tip temperature setting of 700° F., the third indicator light 306 represents a tip temperature setting of 750° F., and the fourth indicator light 308 represents a tip temperature setting of 800° F. The indicator lights 302–308 may be all the same color or can be different colors. The indicated temperatures are approximate only because other factors, such as the tip geometry, may affect the temperature of the tip. Indicator lights may be colored light emitting diodes (LEDs) although incandescent bulbs, fiber optic lights, or any other controllable illumination means can be used. While four indicator lights, 302–308 are shown in FIG. 3, other configurations with more or less indicator lights can be used. Preferably there may be one to one correspondence between possible temperature ranges and indicator lights, although that is not required.

The soldering station also includes selection button 108. The selection button 108 is used, in one embodiment, to change the temperature range of the tip 118. In one embodiment, the selection button 108 is operable only after a proper control card 107 is inserted into the card acceptor 110 of the soldering station 102. The control button 102 is preferably a push button switch requiring a single push to change the temperature of the tip 118. Other types of switches can be used as is well known in the art. In another embodiment, a switch can be integrated with the indicator lights 302–308. In that manner, pushing on the appropriate indicator light may select the new temperature range.

The power supply 202 supplies current to the tip 118 of soldering iron 104 to heat the tip 118 to the appropriate temperature. In one embodiment, the power supply 202 provides a variable current and/or manipulates the number of current pulses in a given period to operate the heaters in the tip 118. In another embodiment, the power supply 202, and therefore, the soldering station 102, may provide four different heat levels. This is for illustrative purposes only. The actual number of fixed temperatures provided for the soldering station may vary depending on the need of the consumer, feasibility of manufacturer and other factors. The heating of soldering tips are disclosed in U.S. Pat. No. 6,329,641 issued on Dec. 11, 2001, to Miyazaki et al. and entitled "Device and Method for Controlling a Soldering Iron" and U.S. Pat. No. 6,087,631 issued on Jul. 11, 2001, to Miyazaki and entitled "Soldering Iron with Temperature Control Cycles Related to Rectified Voltage Cycles", both of which are incorporated by reference.

The control board 204 may receive signals from other components of the soldering station 102 and send control signals to other components of the soldering station 102. For example, the soldering station 102 receives signals from the soldering iron 104 regarding the temperature of the tip 118. If the temperature of the tip 118 is not what it is set to be, the control board 204 sends signals to the power supply 202 to change the output of the power supply 202 to change the temperature of the tip. The control board 204, in one embodiment, is capable of setting and maintaining four temperatures. The number of temperature settings and/or temperature ranges can be changed by replacing the control board 204. For example, the control board 204 may be replaced with another control board 204 that allows for six temperature ranges of 550°, 600°, 650°, 700°, 750°, and 800°. The control board 204 may be designed for easy removal to allow for changes and upgrades. Alternatively, only the parts of the control board 204 that need to be removed to change the temperature ranges may be replaced. The control board 204 includes the CPU 206 and the memory 207. The CPU 206 processes the information received by the control board 204 and generates the control signals. The memory 207 stores any necessary programs, data and lookup tables needed by the CPU 206. The memory 207 may be nonvolatile read-only memory, flash memory, and the like. The CPU 206 can be any commercially available CPU.

The card reader 208 receives the control card 107 that is inserted into the card acceptor 105. The card reader 208 interacts with the control card 107 to determine if the control card 107 presented is valid. If the control card 107 is valid, the user is able to change the temperature setting on the soldering station 102. In one embodiment, the card reader 208 validates any control card 107 presented. In another embodiment, the control cards 107 are assigned to specific individuals and the soldering stations 102 are programmed to only validate cards from certain users. In this embodiment, when a control card 107 is presented, the card reader 208 may read the information stored on the control card 107 and send that information to the CPU 206. The CPU 206 may then determine if the control card 107 is associated with an approved user. If the control card 107 is associated with an approved user, the control board 204 may allow the user to change system parameters. In one embodiment, the card reader 208 reads a magnetic strip on the control card 107. Alternatively, the control card 107 may have a bar code, a smart chip, a radio frequency identification device (RFID), a pattern of holes on the card that forms a pattern when light impinges upon the control card 107, or other means for storing identification information and transmitting identification information to the card reader 208. The card reader 208 is able to decode the information stored on the control card 107 and is able to determine validity of the control card 107. Alternatively, if the control card 107 is not keyed to a specific user, the card reader 208 may be as simple as a button or switch that is manipulated by the insertion of the control card 107 into the card acceptor 105. For example, the insertion of the control card 107 may physically depress a button in the card reader 208. By requiring the insertion of a control card to change the settings of the soldering station 102, inadvertent changes of the temperature of the tip are prevented. Thus, if a soldering process requires a certain temperature of the tip 118 to be maintained, that temperature may not be changed as described in U.S. Pat. No. 4,945,210 issued on Jul. 31, 1990 to Yoshimora and entitled "Card Controlled Soldering Iron Temperature Control Device", discloses a card control system and is hereby incorporated by reference.

In operation, the connector assembly 114 and the cartridge 112, including the tip 118, are connected together and the power cord 116 is connected to the soldering station 102. The soldering station 102 is provided with power typically by insertion of a power cord into a source of electricity. One of the indicator lights 302–308, indicating the current temperature selected may blink as current flows from the power supply 202 to the heater in the tip 118. The blinking lights indicate that the tip 118 is warming up to reach that temperature. Information regarding the temperature of the tip 118 is detected by a sensor within the tip 118 and sent to the control board 204. Once the proper temperature is reached, the indicator light for that temperature range stops blinking and remains steadily lit. Optionally, a buzzer may sound when the correct temperature is reached. Once that occurs, soldering can be done.

To change the tip 118 temperature, the control card 107 is inserted into the card acceptor 105. Once the control card 107 is inserted, a user can depress the button 108. Each time the button 108 is depressed a different indicator light starts blinking, indicating a different temperature is selected. The newly selected indicator light will blink slowly as the tip 118 heats up to the chosen temperature. Then the indicator light will stop blinking and glow steadily. The use of the indicator lights 302–308 and the selection button 108 eliminate the need for segmented LEDs for displays and dials and/or keyboards for setting the system. Accordingly, this leads to a simpler and easier use of the soldering system design.

Figure 4C:
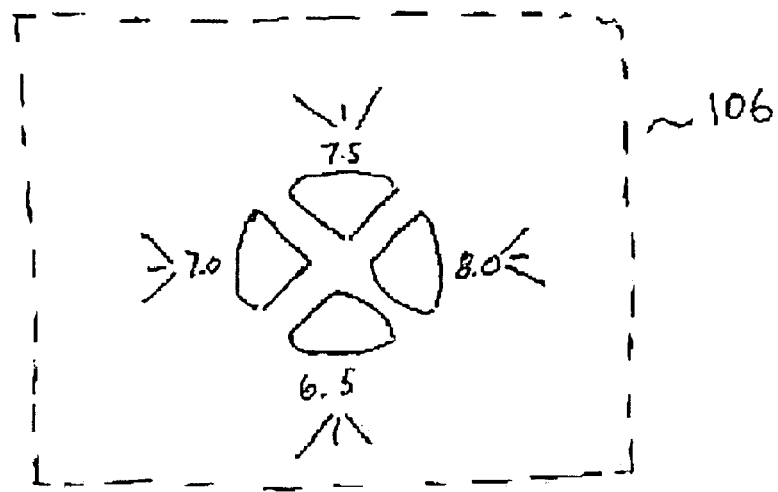
Figure 4D:
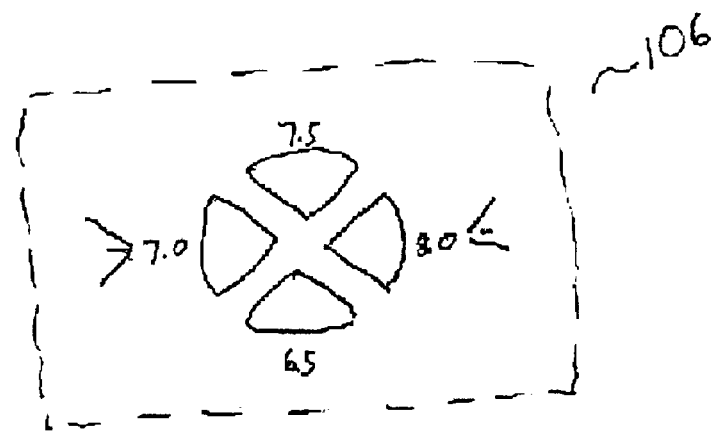

The indicator lights 302–308, in addition to displaying the temperature range for the tip 118, can also display additional information regarding system status by illuminating in certain patterns and in certain states (on, blinking, and off). For example, and as illustrated in FIGS. 4a–4d, the indicator lights 302–308 can display patterns that are indicative of system errors. In FIG. 4a, all indicator lights 302–308 are lit (denoted in FIG. 4a by the double lines near each indicator light). The pattern consisting of all four indicator lights lit indicates that there is a system error. The system error can be an error in a stored program of the soldering station 102 or an error in the memory 207. In FIG. 4b, the third indicator light 306 is blinking (denoted in FIG. 4b by the three lines drawn near third indicator light 306) and the other indicator lights are turned off. This pattern indicates that there is an error in the sensor or heater in the tip. When there is an error in the sensor or heater, the heater in the tip may be shut down. In FIG. 4c, all indicator lights 302–308 are blinking (as represented by the triple lines near each light). The pattern consisting of all four indicator lights blinking indicates that there is a short circuit in the heater terminal of the tip 118. The possible causes of this error include an incompatible tip being used, the improper installation of a tip or foreign material contaminating the connector assembly. In FIG. 4d, the indicator lights 304 and 308 are blinking (as represented by the triple lines near indicator lights 304 and 308). The pattern consisting of blinking indicator lights 304 and 308 indicates that there is an error in the soldering iron 104. The soldering iron error can be that the wrong soldering iron is attached to the soldering station or that no soldering iron is attached. These are only examples of the type of system status information that can be conveyed by the indicator lights 302–308. Additionally, the patterns shown in FIGS. 4a–4b are examples only and different patterns can be used to display the same information, as long as the combination of indicator lights and the illumination status of the indicator lights (on, blinking, and off) are used to convey information concerning the status of the solder system 100 (including the temperature of the tip 118).

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A soldering system comprising:
   at least one soldering iron having a soldering tip;
   a soldering station coupled to the soldering iron by a power cable, the soldering station comprising:
   a power supply operable to generate variable levels of power to heat the soldering tip to a desired temperature; and
   a plurality of indicator lights synchronized with respect to each other to illuminate in a predetermined pattern indicative of system status.

2. The soldering system of claim 1 wherein one or more of the plurality of indicator lights illuminate to indicate the temperature to which the soldering tip is set.

3. The soldering system of claim 1 wherein one or more of the plurality of indicator lights illuminate to indicate a short circuit.

4. The soldering system of claim 1 wherein one or more of the plurality of indicator lights illuminate to indicate an error in a sensor in the tip.

5. The soldering system of claim 1 wherein one or more of the plurality of indicator lights illuminate to indicate an error in a heater in the tip.

6. The soldering system of claim 1 wherein one or more of the plurality of indicator lights illuminate to indicate an error in the connection of the at least one soldering iron to the soldering station.

7. The soldering system of claim 1 further comprising a slot for receiving a control card, the insertion of the control card into the slot allowing a user to change the temperature setting on the soldering station.

8. The soldering system of claim 1 wherein the soldering station further comprises a control board coupled to the power supply, the control board operable to adjust the power supply output.

9. The soldering system of claim 8 wherein the power supply output is adjusted based on information received from one or more sensors in the soldering tip.

10. The soldering system of claim 8 wherein the control board is adapted to be replaced with a second control board, the second control board providing a different number and/or different value of temperature ranges for the soldering tip.

11. The soldering system of claim 1 wherein the indicator lights further comprise a switching means integrated with the indicator lights for allowing selection of a new soldering tip temperature by selecting one of the indicator lights.

12. A soldering station comprising:
    a power supply;
    a control board coupled to the power supply, the control board operable to adjust the power supply output;
    a card reader coupled to the control board, the card reader operable to receive a control card to allow a user to change the settings of the soldering station; and
    a plurality of indicator lights, the plurality of indicator lights synchronized with respect to each other to illuminate in a predetermined pattern indicative of the status of the soldering station.

13. The soldering station of claim 12 wherein one or more of the plurality of indicator lights illuminate to indicate the temperature to which a tip of a soldering iron connected to the soldering station is set.

14. The soldering station of claim 12 wherein one or more of the plurality of indicator lights illuminate to indicate a short circuit.

15. The soldering station of claim 12 wherein one or more of the plurality of indicator lights illuminate to indicate an error in a sensor in a soldering iron tip.

16. The soldering station of claim 12 wherein one or more of the plurality of indicator lights illuminate to indicate an error in a heater in a soldering iron tip.

17. The soldering station of claim 12 wherein one or more of the plurality of indicator lights illuminate to indicate an error in the connection of a soldering irons to the soldering station.

18. The soldering station of claim 12 wherein the power supply output is adjusted based on information received from at least one sensor in a soldering tip.

19. The soldering station of claim 12 herein the control board is adapted to be replaced with a second control board, the second control board providing a different number of and/or different value of temperature ranges for the soldering tip.

20. The soldering station of claim 12 wherein the indicator lights further comprise a switching means integrated with the indicator lights for allowing selection of a new soldering tip temperature by selecting one of the indicator lights.

21. A soldering station comprising:
    a control board operatively couplable to a power supply, the control board operable to adjust the power output from the power supply; and
    a plurality of indicator lights synchronized with respect to each other, the control board communicably coupled to the plurality of indicator lights to illuminate the plurality of indicator lights in a predetermined pattern indicative of status of the soldering station.

22. The soldering station of claim 21 wherein the plurality of indicator lights include at least four indicator lights, and one of the four indictor lights is illuminated to indicate an error in a sensor or heater in a tip of a soldering iron.

23. The soldering station of claim 21 wherein the plurality of indicator lights include at least four indicator lights, and all of the four indictor lights are illuminated to indicate a short circuit in a soldering station.

24. The soldering station of claim 21 wherein the plurality of indicator lights include at least four indicator lights, and two of the four indictor lights are illuminated to indicate an error in the connection of the soldering iron to a soldering station.

25. The soldering station of claim 21 wherein one or more of the plurality of indicator lights illuminate to indicate the status of the soldering station by staying on or by blinking.

26. The soldering station of claim 21 wherein the plurality of indicator lights includes a first indicator light, a second indicator light, a third indicator light, and a fourth indicator light, and all of the first, second, third and fourth indictor lights are illuminated to indicate a system error.

27. A soldering system including:
    at least one soldering iron having a soldering tip; and
    a soldering station coupled to the soldering iron, the soldering station comprising:
    a control board operatively couplable to a power supply, the control board operable to adjust the power output from the power supply to heat the soldering tip to a temperature setting; and a plurality of indicator lights, each of the plurality of indicator lights representing a different temperature setting, the control board communicably coupled to the plurality of indicator lights to illuminate one of the plurality of indicator lights that is indicative of the temperature setting.

28. The soldering system of claim 27 wherein the soldering station includes a selection button whose actuation causes the desired temperature setting to be changed.

29. The soldering system of claim 27 wherein the plurality of indicator lights includes at least four indicator lights, and a first of the four indicator lights represents a first temperature of the tip, a second of the four indicator lights represents a second temperature of the tip, a third of the four indicator lights represents a third temperature of the tip, and a fourth of the four indicator lights represents a fourth temperature of the tip.

30. A soldering station comprising:

a soldering station housing having an indicator panel;

the housing being operatively connectable to a soldering iron having a soldering iron tip;

an arrangement of indicator lights at the panel;

at least two of the lights being operable in at least two of "off," "blinking" and "steady-on" alternative states;

at least one of the lights being operable in "off," "blinking" and "steady-on" alternative states;

the lights in the arrangement forming a plurality of different alternative lighting patterns by their individual states;

a first one of the lighting patterns indicating a first temperature of the tip when the housing is operatively connected to the soldering iron; and a second one of the lighting patterns indicating a second temperature of the tip when the housing is operatively connected to the soldering iron.

31. The soldering station of claim 30 wherein a third one of the lighting patterns indicates a third temperature of the tip when the housing is operatively connected to the soldering iron.

32. The soldering station of claim 31 wherein a fourth one of the lighting patterns indicates a fourth temperature of the tip when the housing is operatively connected to the soldering iron.

33. The soldering station of claim 32 wherein the first temperature is 650°F, the second temperature is 700°F, the third temperature is 750°F, and the fourth temperature is 800°F.

34. The soldering station of claim 30 wherein a first one of the lights is associated with the first temperature, and the first lighting pattern includes the first light being in the "on" state.

35. The soldering station of claim 33 wherein the first lighting pattern includes all of the lights except for the first light being in the "off" state.

36. The soldering station of claim 30 wherein a fifth one of the lighting patterns indicates that the tip is being heated to the first temperature with the housing operatively connected to the soldering iron, but has not yet reached the first temperature.

37. The soldering station of claim 36 wherein a first one of the lights is associated with the first temperature, and the fifth lighting pattern includes the first light being in a "blinking" state until the tip reaches the first temperature when the first light is then in the "steady-on" position and the indicator lights are then in the first lighting pattern.

38. The soldering station of claim 30 wherein a sixth one of the lighting patterns indicates an error in a sensor or a heater in the tip with the housing operatively connected to the soldering iron.

39. The soldering station of claim 30 Wherein a seventh one of the lighting patterns indicates an error in the connection of the soldering iron to the soldering station.

40. The soldering station of claim 30 wherein an eighth one of the lighting patterns indicates a short circuit in a heat terminal of the tip with the housing operatively connected to the soldering iron.

41. The soldering station of claim 40 wherein the eighth lighting pattern includes all of the lights being in the "blinking" state.

42. The soldering station of claim 30 wherein all of the lights are operable in "off," "blinking" and "steady-on" alternative states.

43. A The soldering station of claim 30 wherein the arrangement of indicator lights includes four lights, each spaced in different quadrants of a circle.

44. The soldering station of claim 30 wherein the housing includes a slot for receiving a control card, the insertion of the control card into the slot allowing a user to change the temperature setting of the soldering station.

45. The soldering station of claim 30 further comprising selection means associated with the indicator lights for allowing selection of a new soldering tip temperature by selecting one of the indicator lights.

* * * * *